(No Model.)

E. S. BENNETT.
TRUCK FRAME.

No. 536,775.  Patented Apr. 2, 1895.

WITNESSES:

INVENTOR
E. S. BENNETT
BY
ATTORNEY

UNITED STATES PATENT OFFICE.

ERASTUS S. BENNETT, OF DENVER, COLORADO.

TRUCK-FRAME.

SPECIFICATION forming part of Letters Patent No. 536,775, dated April 2, 1895.

Application filed November 24, 1894. Serial No. 529,891. (No model.)

*To all whom it may concern:*

Be it known that I, ERASTUS S. BENNETT, a citizen of the United States of America, residing at Denver, in the county of Arapahoe and State of Colorado, have invented certain new and useful Improvements in Truck-Frames; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in truck frames, and my object is to provide means for readily moving the truck in a transverse direction, or at right angles to its normal movement on the main wheels of the truck.

The advantages of my present improvement will probably be best understood if I assume that a dredge or dredging machine is mounted on the truck, and that the machine is employed in cutting into the side of an embankment. In this case, the ordinary wheels of the truck run upon a track laid alongside of the embankment and in suitable proximity thereto. After the work has been carried on for some time and the embankment has been so far cut away that it can no longer be reached while the truck is standing on this track, it becomes necessary to move the truck and its supporting mechanism nearer the bank. Hence, another track is laid parallel with the first track, and it then becomes necessary to transfer the machine from one track to the other. This change is often very difficult of accomplishment with the old style trucks. By means of my improvement, however, the change may be quickly and easily made from any location where the machine may be standing.

Having thus outlined the function of the invention and the difficulty it is intended to overcome, I will now describe the same in detail, reference being had to the accompanying drawings in which is illustrated an embodiment thereof.

Figures 1, 2:
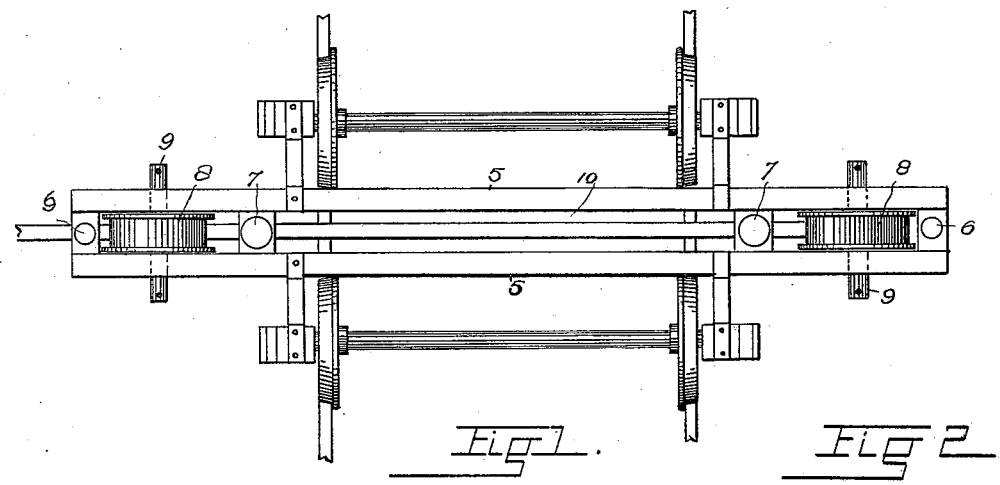
Figure 4:
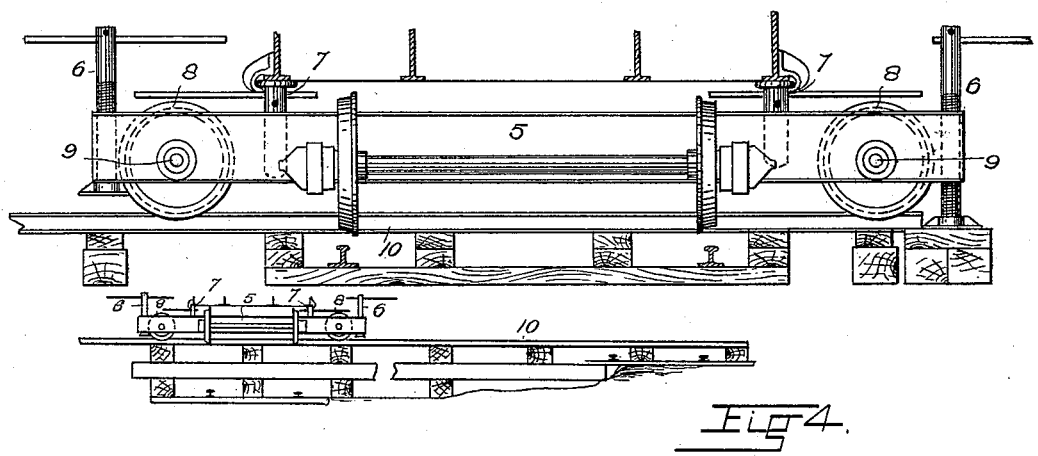
Figure 3:
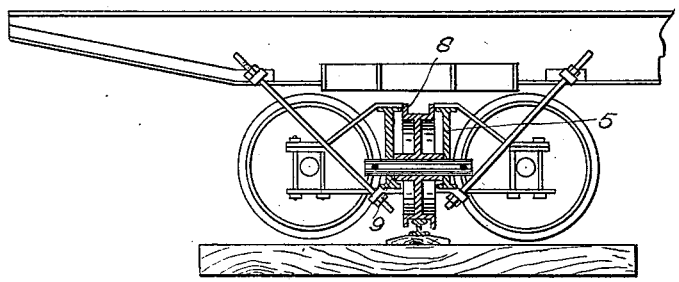

In the drawings, Figure 1 is a top or plan view of a truck provided with my improvements. Fig. 2 is an end elevation thereof. Fig. 3 is a side elevation of the truck shown in connection with a platform mounted thereon. In this view, the eye-beams and the auxiliary wheel are shown in section. Fig. 4 illustrates my improved truck on a smaller scale and blocked up above one track in position for movement to a more elevated parallel track.

Similar reference characters indicating corresponding parts in these views, let the numeral 5 designate two transverse I-beams forming a part of the truck frame and extending a suitable distance beyond the wheels on either side. At the extremities of these I-beams and engaging nuts secured between them, are located the lifting screws 6. The I-beams are further provided with the leveling screws 7 which engage the platform upon which any desired superstructure is mounted. These I-beams 5, together with the lifting screws and leveling screws are substantially the same as shown in United States Letters Patent No. 527,741, issued to me and bearing date October 16, 1894, to which reference is made for details of the structure.

Between the screws 6 and 7 on either side of the truck, and journaled in the I-beams, are located the auxiliary wheels 8, which occupy a position at right angles to the main wheels of the truck. It must be assumed in this description that there are two truck frames, one frame being located under each end of the platform, and that two auxiliary wheels 8 are used in connection with each truck.

The wheels 8, as shown in the drawings, are double flanged and made fast to axles 9 which protrude through the I-beams, and are provided with apertures adapted to receive lever bars. These wheels may, of course, be actuated in any other suitable manner; for instance, they may be connected with and operated from the motor located on the platform and employed in operating the dredge or other mechanism. The means employed in turning these wheels is, of course, a minor feature and need not be more specifically mentioned in this specification. It will be observed that the lowermost arcs of the peripheries of the wheels 8 occupy a higher plane than the corresponding arcs of the main truck wheels. Hence, when the main wheels are in position on the truck, the auxiliary wheels 8 are sufficiently elevated to offer no obstruction to the ordinary working of the machine.

When it is desired to move the truck in a direction at right angles to the normal movement, the truck is first raised by means of the lifting screws 6 until the main truck wheels are free from the track and the entire structure is elevated sufficiently for the purpose. A transverse track 10 is then laid beneath the wheels 8 and extending to the track nearer the embankment to which it is desired to transfer the truck. By applying hand bars to the projecting extremities of the axles 9 of the wheels 8, the entire structure may be quickly shifted from one parallel track to a position directly above the other parallel track. Then by raising the truck, removing the transverse track 10, and again lowering the truck to the parallel track, the machine is again in position for use.

It will be observed that the auxiliary wheels 8 may be journaled in the I-beams intermediate the two sides of the truck frame instead of in the lateral extensions of said beams outside of, or beyond, the truck frame.

It may be observed that the wheels 8 in connection with the lifting screws 6, also enable me to move the structure sidewise from one track to another even when there is considerable difference in the elevation of the two tracks, and at the same time, to maintain a level grade in the cross track. This is an important feature, especially in cases, where from various causes, the depth of the excavation must vary—obviating the necessity for long switching tracks to obtain practicable grades to overcome the difference in elevation, the structure being lifted by the screws, and the cross track blocked up to the desired level. (See Fig. 4.)

Having described my invention, what I claim is—

The combination with the truck frame provided with the main track wheels, of auxiliary wheels carried by the frame at right angles to the main wheels, said auxiliary wheels adapted to run on a temporary track at an angle to the main track, and lifting screws in the frame adjacent the auxiliary wheels, substantially as set forth.

In testimony whereof I affix my signature in the presence of two witnesses.

ERASTUS S. BENNETT.

Witnesses:
JULIUS BROWN,
CHAS. E. DAWSON.